United States Patent [19]
Turcotte

[11] 3,976,879
[45] Aug. 24, 1976

[54] WELL LOGGING METHOD AND APPARATUS USING A CONTINUOUS ENERGY SPECTRUM PHOTON SOURCE

[75] Inventor: Ronald E. Turcotte, West Redding, Conn.

[73] Assignee: Schlumberger Technology Corporation, New York, N.Y.

[22] Filed: May 22, 1975

[21] Appl. No.: 580,398

[52] U.S. Cl. ............................ 250/266; 250/269
[51] Int. Cl.² ....................................... G01V 5/00
[58] Field of Search .......... 250/253, 261, 262, 264, 250/265, 266, 269

[56] References Cited
UNITED STATES PATENTS

| | | | |
|---|---|---|---|
| 3,223,968 | 12/1965 | De Shazo, Jr. | 250/269 X |
| 3,564,251 | 2/1971 | Youmans | 250/269 |
| 3,846,631 | 11/1974 | Kehler | 250/269 |
| 3,864,569 | 2/1975 | Tittman | 250/269 X |
| R23,226 | 5/1950 | Bender | 250/269 |

Primary Examiner—Davis L. Willis
Attorney, Agent, or Firm—William R. Sherman; Edward M. Roney; Kenneth Olsen

[57] ABSTRACT

In accordance with an illustrative embodiment of the present invention, a method and apparatus for logging an earth formation of interest is disclosed in which repetitive bursts of a continuous energy spectrum of photons are emitted that penetrate the media surrounding a borehole traversing the earth formation. Thereafter, indications of photons resulting from the interaction of the emitted photons and the surrounding media are obtained, each indication begin obtained at a different separation from the source along the axis of the borehole. Finally, the indications are compared to determine representations of a characteristic of the media surrounding the borehole. According to one aspect of the present invention, at least one of the indications is the result of annihilation photons produced by the interaction of the emitted photons and the surrounding media.

26 Claims, 5 Drawing Figures

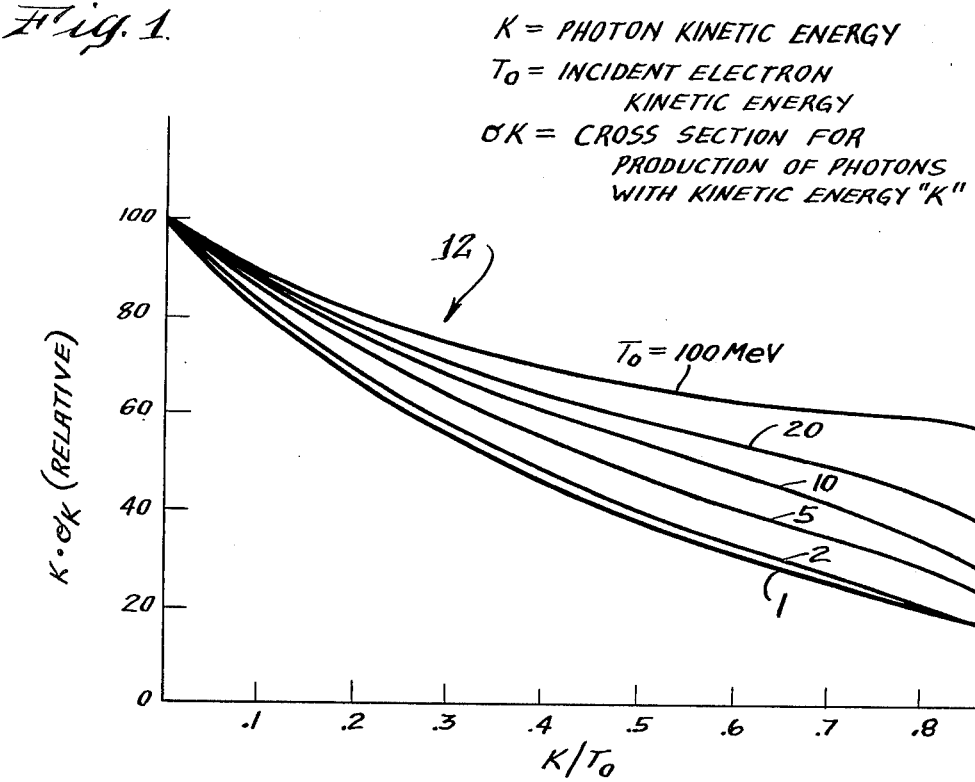
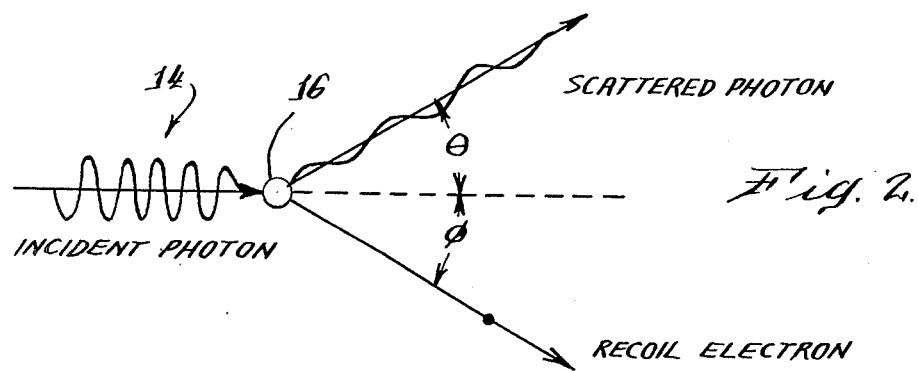
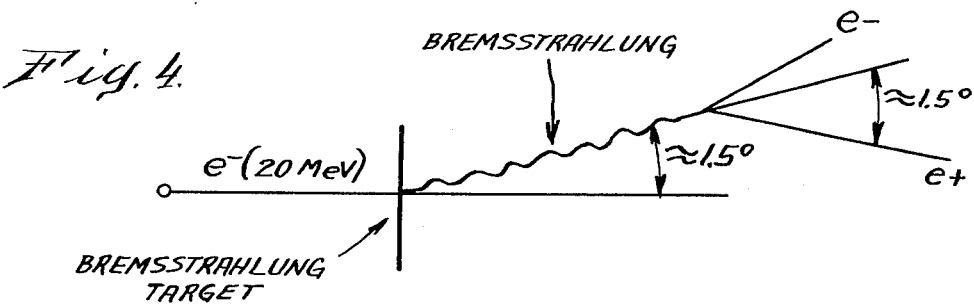

WELL LOGGING METHOD AND APPARATUS USING A CONTINUOUS ENERGY SPECTRUM PHOTON SOURCE

BACKGROUND OF THE INVENTION

The present invention pertains to the logging of earth formations by the use of logging instruments that have sources of high-intensity, high-energy photons and that are passed through a borehole traversing the earth formation of interest and, more specifically, to methods and apparatus for logging in which the photon source is capable of being pulsed and produces a burst of photons that has a continuous energy spectrum and in which the logging instrument includes at least one photon detector.

In order to avoid confusion, the term "photon" has been used throughout the present application to mean high frequency electromagnetic radiation regardless of how it originates. Therefore, the term is meant to include gamma rays, x-rays and Bremsstrahlung, each of which consist of high frequency electromagnetic radiation but are classified, in general, by the way in which they originate.

The usefulness of well logging instruments having photon sources and photon detectors for obtaining indications of earth formation density surrounding a borehole is well known, and the principles on which they operate are, similarly, well known to those skilled in the art. Generally, such density logging instruments take advantage of the Compton scattering effect, a phenomenon by which a photon is scattered in an interaction with an essentially free electron in the scattering medium. The photon scattering thus achieved can be detected and related to bulk density of the scattering medium as disclosed, for example, in U.S. pat. No. 3,321,625, issued May 23, 1967 to Wahl and assigned to the assignee of the present application or, more recently, as shown in the density computer described in U.S. Pat. No. 3,590,228, issued June 29, 1971 to Burke and also assigned to the assignee of the present invention.

Well logging instruments having photon sources and photon detectors are also useful for obtaining indications of earth formation lithology by making use of the photoelectric effect to derive an effective atomic number for an earth formation. Typical of present lithology logging techniques is that disclosed in U.S. pat. No. 3,864,569, issued Feb. 4, 1975 to Tittman and assigned to the assignee of the present application.

Previously, photon sources used for density and lithology logging purposes have included radioactive isotopes such as radium 226, cesium 137 or cobalt 60. Such isotopes are convenient to use, but they have several significant shortcomings: (1) The energy range of emitted photons is limited, thereby limiting the types of photon interactions that can be used for well logging purposes, (2) the maximum activity that can be safely and conveniently handled in field operations is limited to a few Curies, thereby limiting the precision of any media characteristic determination by limiting the numbers of photons returning to the borehole, (3) the isotopes are continuously emitting, so timing measurements are not possible, and (4) they emit photons uniformly in all directions, thereby complicating logging-instrument shielding problems.

As a result, present methods and apparatus for logging earth formations in which photons are emitted to penetrate the media surrounding a borehole and in which indications of photons resulting from the interaction of the emitted photons and the surrounding media are obtained to determine a characteristic of the media have had a limited depth of investigation; that is, they have been unable to determine media characteristics beyond a limited distance from the borehole into the media. Consequently, mudcake and other borehole distortions have significantly detracted from the accuracy of the desired media characteristic determination and have resulted in the expenditure of considerable effort in the well-logging industry toward the development of correction factors and charts to compensate for such borehole distorting effects. Furthermore, the types of photon interactions used for media characteristic determinations have been restricted, and those interactions that have been used have not provided the degree of precision desired.

SUMMARY OF THE INVENTION

It is, therefore, an object of the present invention to provide new methods and apparatus for logging an earth formation of interest using a high-intensity, high-energy photon source to determine a characteristic of the media surrounding a borehole traversing the earth formation.

It is also an object of the present invention to provide a method and apparatus for determining a characteristic of the media surrounding a borehole that traverses an earth formation and in which a high-intensity source has been pulsed to emit repetitive bursts of continuous energy spectrum photons that penetrate the media.

There is provided, therefore, in accordance with the present invention a method and apparatus for logging an earth formation of interest in which repetitive bursts of a continuous energy spectrum of photons are emitted that penetrate the media surrounding a borehole traversing the earth formation. Thereafter, indications of photons resulting from the interaction of the emitted photons and the surrounding media are obtained, each indication being obtained at a different separation from the source along the axis of the borehole. Finally, the indications are compared to determine representations of a characteristic of the media surrounding the borehole. According to one aspect of the invention, at least one of the indications is the result of annihilation photons produced by the interaction of the emitted photons and the surrounding media.

In the method and apparatus for logging the media surrounding a borehole that is described herein, a source of photons is used that includes (1) a means for emitting repetitive bursts of charged particles, such as electrons, from a grid-controlled filament or cathode; (2) a means for accelerating the charged particle bursts to high energy levels, such as a standing wave, linear particle accelerator, and (3) a target material that emits photons when bombarded by the accelerated bursts of charged particles.

In operation, the high energy, charged particles strike the target and produce a high-intensity burst of photons at such high energy levels that the problems of penetration of the media surrounding the borehole, which may or may not include, for example, casing, a cement annulus, drilling mud or residual mudcake and an altered formation zone in front of the virgin formation, are mitigated.

To take advantage of that deep photon penetration, the apparatus disclosed in accordance with the present invention includes a number of photon detectors positioned along the axis of the logging instrument to obtain indications that result from photon interactions at varying distances from the borehole into the surrounding media. The individual detectors may also be collimated to further define their depths of investigation into the surrounding media.

For continuous spectrum photon bursts with end-point energies in the 3–5 MeV range, Compton scattering is the predominant photon interaction and the characteristic of the media that is to be determined is obtained by detecting photons that scatter back to the borehole. When, however, the end-point energy of the photon burst is in a range of at least 20–25 MeV, the pair-production interaction is used to determine the desired media characteristic.

Indications of the photons returning to the borehole from each of the detectors may be compared to determine the characteristic of the media, and, since each of the detectors has a different depth of investigation by virtue of their different separations from the source along the axis of the borehole and by virtue of the collimation of the individual detectors, the various media characteristic indications can be combined to produce a profile of the characteristic of the media. That is, the characteristic of the media at different distances from the borehole into the media may be displayed in a side-by-side arrangement to facilitate a comparison of their values, to assist in the location of invasion boundaries and the determination of other media parameters, and for other purposes.

As many detectors may be included in the logging instrument as are desired, provided that adequate count rates are obtained to insure statistically-reliable indications. Associated with each detector may be a linear gate or other means for controlling the detector output so that time dependent indications of photons returning to the borehole may be obtained and, in conjunction with the detector collimation, the detection of background radiation may be minimized.

BRIEF DESCRIPTION OF THE DRAWING

Further objects and advantages of the present invention will be apparent and a better understanding of the invention will be gained from a consideration of the following description of the preferred embodiments, taken in conjunction with the appended figures of the drawing, in which:

FIG. 1 is a graphical representation illustrating typical photon spectra emitted by a logging instrument;

FIG. 2 is a schematic representation of the Compton scattering effect;

FIG. 4 is a schematic representation of the pair production effect; and

DESCRIPTION OF THE PREFERRED EMBODIMENTS

Figure 3:
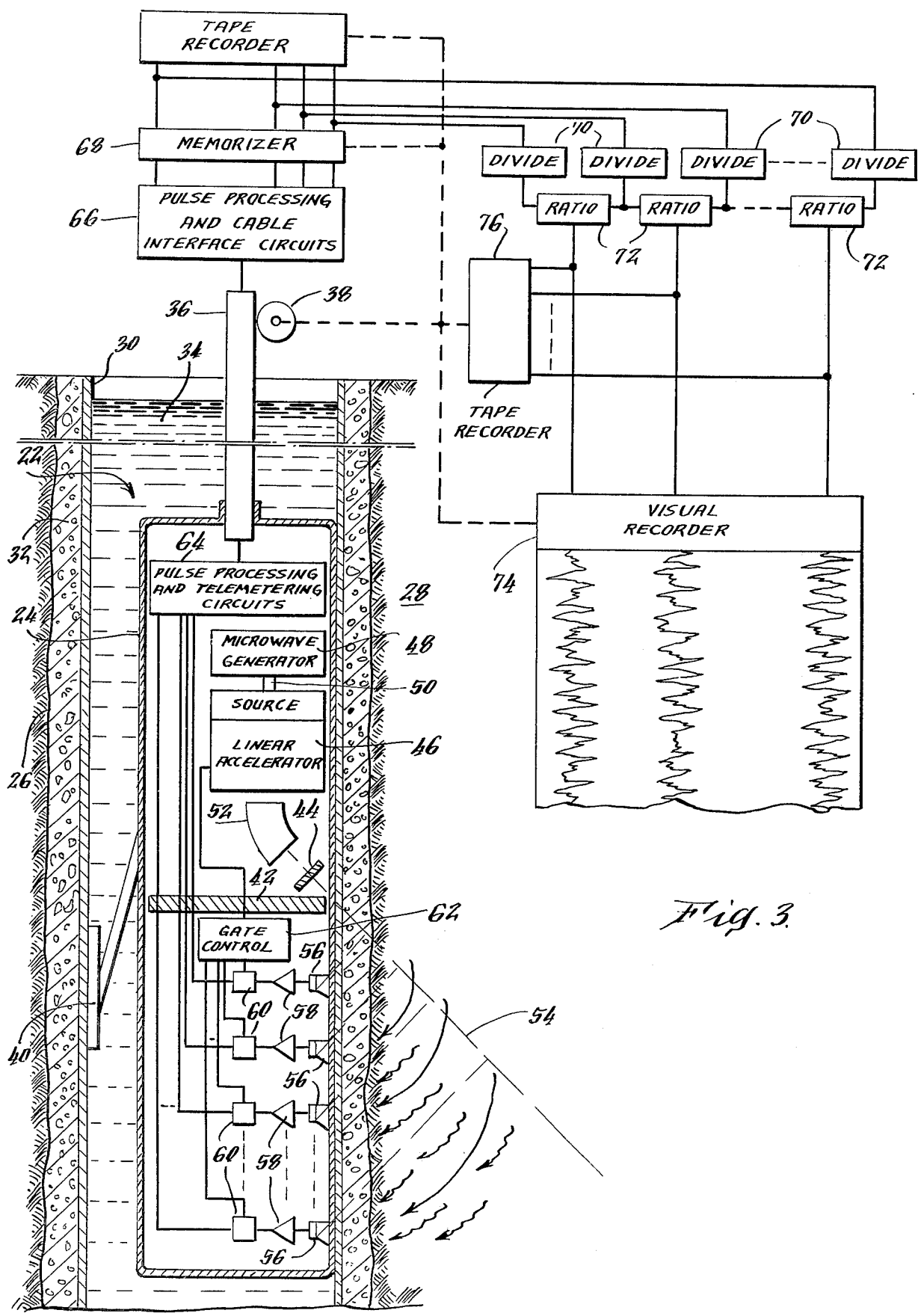
FIG. 3 is a representational view in longitudinal section showing one embodiment of a logging instrument in accordance with the present invention.

In the representative embodiments of the invention described hereinafter, a method and apparatus for logging an earth formation of interest is disclosed in which repetitive bursts of a continuous energy spectrum of photons are emitted that penetrate the media surrounding a borehole traversing the earth formation. Three or more indications of photons resulting from the interaction of the emitted photons and the surrounding media are obtained, each indication being obtained at a different separation from the source along the axis of the borehole, and the indications are compared to determine two or more representations of a characteristic of the media surrounding the borehole.

According to one aspect of the present invention, a plurality of indications of photons resulting from the interaction of the emitted photons and the surrounding media are obtained, at least one of the indications being the result of annihilation photons produced by the interaction of the emitted photons and the surrounding media and each indication being obtained at a different separation from the source along the axis of the borehole. Thereafter, the indications are compared to determine a representation of a characteristic of the media surrounding the borehole.

Referring to the figures of the drawing for a more complete understanding of the present invention, FIG. 1 shows a series of curves 12 representing the various spectra of photons that can be produced by bombarding a suitable target material with bursts of high-energy electrons. Apparatus appropriate for producing such high-energy, electron bursts is described in copending U.S. patent application, Ser. No. 580,071 of Turcotte et al., filed concurrently herewith and assigned to the assignee of the present application.

It is apparent from the curves, which have been normalized to unity for zero photon energies, that regardless of the energy of the electrons incident on the target material, a broad spectrum of photons is produced that is continuous up to an end-point energy value that approaches the energy of the incident electrons. With an incident electron having a kinetic energy of 20 MeV, for example, the curves indicate that even at 18 MeV the intensity of photons produced would still be approximately one-third of the intensity of photons produced at energy levels below 2 MeV.

One logging technique that takes advantage of such a high intensity, continuous energy spectrum of photons, in accordance with the present invention, makes use of the Compton scattering effect and is in the area of logging known generally as density logging.

As is well known, the Compton effect is the scattering of a photon by an essentially free electron. In the process, the photon loses energy to the electron and is altered in direction. The Compton effect for any given atom is the additive effect of all its electrons, and the probability for Compton scattering to occur is determined by the electron density, which depends in turn on the bulk density of the earth formation.

Shown in FIG. 2 is a schematic representation of the Compton scattering process. A photon 14 with energy E incident on an electron 16 is scattered through an angle $\theta$ and is left with energy E', which is less than the incident energy E. The difference in energy between E and E' is transmitted as kinetic energy to the recoiling electron, which scatters through an angle $\phi$. The relation between the incident energy E, the scattering angle $\theta$ and the scattered energy E' is given by:

$$E' = \frac{E}{1 + \frac{E}{.511}(1-\cos\theta)} \qquad (1)$$

where energies are measured MeV. For photons with energies above a few hundred keV but less than a few MeV, energy loss by Compton scattering occurs predominantly in a forward direction (that is, $\theta$ is small) until the photon energy has degraded to a point where scattering in all directions becomes equally likely (that is, diffusion effects predominate). Therefore, in a burst of photons having a broad spectrum of energies that is continuous up to an end-point energy exceeding a few hundred keV, the higher energy photons will tend initially to penetrate the media surrounding the borehole in a generally forward direction.

The burst can thus be thought of as being made up of a number of components each defined by a range of energies, say 0.5 MeV, giving a burst with a spectrum having an end-point energy of, for example, 3-5 MeV, a total of up to 10 components. The lowest component, that is the 0 to 0.5 MeV component, would begin diffusing through large angle Compton scattering almost immediately; the second component would penetrate a little further into the formation before losing enough energy through small angle Compton scattering to being diffusing back to the borehole; the third component would penetrate still further before diffusing back to the borehole, and so on up to the tenth component.

To take advantage of the information that can be extracted from each of these components, a logging instrument having a source-detector arrangement such as shown in FIG. 3 may be used.

The well logging instrument 22 shown in FIG. 3, which is configured in accordance with one aspect of the present invention, includes a fluid tight housing 24 adapted to be suspended in a borehole 26 that traverses earth formation 28. The borehole may be either cased, as represented by casing 30 andd cement annulus 32, or uncased, and it may be filled with a drilling mud or other fluid 34. Suspension and vertical movement of the housing 24 is controlled by an armored cable 36, which extends to the earth's surface and passes over a winch 38 provided with a commutating arrangement (not shown) allowing electrical signals to be transmitted between the instrument and the surface equipment. The housing 24 is urged against the casing by a conventional eccentering means such as a bow spring or a spring-loaded hydraulic system 40.

The instrument includes an upper, electron-acceleration and radiation-generating section and a lower, radiation-detection sectiion that are separated by a shield 42. The shield may be fabricated by any material appropriate to prevent unacceptable levels of photon radiation from reaching the detection section.

In the upper section, a high intensity, continuous energy spectrum of photons, such as the spectra shown in FIG. 1, is produced by bombarding an appropriate target 44 with a beam of high energy electrons as described in the above mentioned application Ser. No. 580,071 of Turcotte et al. In the instrument, electrons are produced and accelerated in an electron source and microwave linear particle accelerator 46, which is preferably a standing wave-type, operating in a $\pi/2$ mode and which is excited by one or more microwave generators or magnetrons 48 through one or more waveguides 50. Appropriate power supplies (not shown) are provided at the surface and in the instrument for providing the required power to the various uphole and downhole components of the logging instrument. The bursts of high energy electrons produced by accelerator 46 are deflected, for example by magnet 52, to strike the target 44 to produce high intensity bursts of continuous-energy spectrum photons as described above.

The specific construction of the microwave generator, the linear accelerator and the deflecting means and their operation in producing a burst of photons is described in detail in the above identified Turcotte et al. application, Ser. No. 580,071 and need not be repeated in full here except by reference. Briefly, the source and linear accelerator 46 includes a grid controlled, electro-emissive cathode that supplies relatively short bursts of electrons to a number of substantially identical accelerating cavities that are successively arranged along the axis of the linear accelerator. The linear accelerator is excited with microwave energy from the magnetron 48, which operates in a frequency range covering the resonant frequency of the accelerating cavity and sets up a standing wave in the cavity for acceleration of the electrons. As described in the above-identified Turcotte et al. application, electrons accelerated to an energy of approximately 20 MeV may be obtained at an operating frequency of approximately 6 GHz through the use of 30 accelerating cavities in a linear accelerator with a total length of approximately 5 feet. However, electrons of any other desired energy may be obtained by varying the number of cavities so that a burst of photons with a spectrum having any desired end-point energy can be obtained by varying the number of cavities in the linear accelerator.

The instrument shown in FIG. 3, therefore, includes an accelerator 46 that has a sufficient number of accelerating cavities to produce a beam of photons 54, each burst of which has an end-point energy in the 3-5 MeV range. As discussed above, the lowest energy component of the photon burst begins diffusing through large angle Compton scattering almost immediately, with increasing energy components penetrating further and further into the formation before diffusing back to the borehole. Accordingly, the radiation detection section of the instrument 22 includes a number of detectors 56 spaced along the instrument in the lower radiation detection section generally as shown in FIG. 3.

Each of the detectors 56, which are, advantageously, small in size and efficient in operation and may comprise, for example, semiconductor detectors or scintillation crystal/photomultiplier tube detectors, produces a signal representative of a information furthest detected photon that is amplified in a preamplifier 58 and controlled by a linear gate 60, as described hereinafter, in order to coordinate its detection period with the emission of the photon beam 54. Since the beam 54 is continually diverging from the borehole, contiguous detectors receive information from a particular contiguous component of the emitted photon beam, and, since the higher energy components of the beam penetrate more deeply into the formation, the detectors furthest from the source would receive scattered photons giving density information from deeper within the formation than the nearer detectors. Furthermore, the detectors may be partially collimated, generally as shown, to improve the definition of the depth of investigation of each individual detector.

The detection period of the individual detectors may be coordinated by a signal derived from the beam intensity signal of the accelerator 46, as described in the Turcotte et al. application, that is applied to a control circuit 62, which may include appropriate circuitry, for example, to either open all of the gates 60 simultaneously in a common detection period or to obtain time dependent indications of photons returning to the borehole by sequencing the various detection periods to, for example, take into consideration the diffusion time necessary for the photons that penetrate more deeply into the formation to be scattered back to the borehole. Other control schemes are possible; in general, however, use of the gates 60 minimizes the detection of background radiation and reduces, thereby, the pulse processing load on the downhole electronics.

The signals from detectors 56 and preamplifier 58, if passed by linear gates 60, are applied to a downhole pulse processing and telemetering circuit 64 that conditions and transmits the signals to the surface through cable 36. At the surface the signals are received in a cable interface and pulse processing circuit 66 that distinguishes the signals from electrical noise and reconditions the pulses.

Transmission of the pulses from downhole to the surface may either be by individual conductors dedicated to a specific detector, such as disclosed in U.S. Pat. No. 3,559,163 issued Jan. 26, 1971 to Schwartz and assigned to the assignee of the present application, or, in view of the high count rates involved and the probable use of more than one detector, preferably by a multiplexed pulse telemetering system such as that disclosed in U.S. patent application, Ser. No. 563,507 of Nelligan for "System for Telemetering Well Logging Data", filed Mar. 31, 1975 and assigned to the assignee of the present application.

Regardless of the transmission system used to transmit pulses from detectors 56 to the surface of the earth, it will be desirable to accumulate the counts representative of detected photons for each detector so that density measurements derived for each detector will be derived for the same depth levels along the axis of the borehole. If, for example, the above-identified Nelligan telemetering system is used, sufficient memory addresses may be provided for each detector so that the counts recorded after each burst of the accelertor 46 will be accumulated in a separate memory before the binary-coded count total is transmitted to the surface. At the surface, the processed count totals are depth correlated in a standard depth memorizer 68, which operates at a rate controlled by winch 38, so that the memorizer 68 outputs detected count totals that have been accumulated at the same depth in the borehole for each of the detectors 56. These individual depth count totals may then either be further accumulated in one or more binary counters (not shown), if desired, to define a number of depth ranges in the borehole or the individual burst count accumulations can be further processed as explained hereinafter.

The depth correlated count totals from each of the detectors 56 may be compared with one another to measure density variations along the length of the earth formation traversed by the beam 54 to provide indications of density changes, and the indications may be combined to provide a density profile, that is, to provide an indication of density changes with increasing distance from the borehole into the earth formation. Such a density profile may be used, for example, to give an indication of formation permeability by locating the boundary of a flushed zone.

One comparison method suitable to provide such a density profile is represented by the surface components shown in FIG. 3. As described above, memorizer 68 outputs detected count totals for each of the detectors 56 that have been correlated to the same depth point or depth range in the borehole. The individual detector count totals, which represent detected count rates, are applied to a plurality of divide circuits 70, which compensate the individual detector count rates for the geometrically introduced distortion resulting from the increased spacing of the individual detectors from the photons emitted by target 44. Accordingly, each divide circuit 70 will reduce the count rate by a different geometrical factor depending on the separation of a specific detector 56 from the emitter photon beam. An alternative to using detectors of equal sensitivity and reducing their count rates as just described, would be to use detectors 56 that have different sensitivities based on their separation from the photon source. A discussion of the considerations of detector sensitivity versus detector/source separation and the inverse nature of that relationship is found in U.S. Pat. No. 3,321,625, issued to Wahl on May 23, 1967 and assigned to the assignee of the present application.

Once the individual detector count rates have been corrected for the geometrical distortion introduced by varying source/detector separations, the count rates are applied to a number of ratio circuits 72, which combine the count rates for adjacent pairs of detectors 56 to give an indication of density changes with increasing distance from the borehole into the formation. Other methods of combining the detected count rates may be used; for example, rather than take the ratios of the count rates of adjacent detectors, it might be desirable to develop a density profile by taking ratios with respect to a common detected count rate, such as the count rate of the detector closest to the emitted photon beam. Another possibility would be to use the count rate for one or more of the detectors closest to the emitted photon beam to derive a mudcake correction, as described in the above-identified Wahl patent, and use that correction with the remaining count rates to derive a density profile corrected for mudcake induced distortions.

Regardless of the method chosen to compare the count rates, the density change indications may be combined in a conventional display apparatus for contemporaneous readout, such as a visual recorder 74 that includes the necessary digital-to-analog conversion circuits, and may also be recorded on a tape recorder 76 for later display at a location remote from the borehole. Furthermore, the depth correlated counts from memorizer 68 may be recorded directly for processing at a location remote from the borehole, as for example, at a centralized computing center. As may be seen from FIG. 3, the number of detectors and associated preamplifiers and gates included in logging instrument 22 is not limited to four. As many detectors may be provided as can be included within the logging instrument and still provide count rates at acceptably high levels while producing a profile of the density changes with distance from the borehole into the earth formation.

Although the embodiment shown in FIG. 3 has been described in conjunction with a determination of the density of the media surrounding the borehole, the detected count rate from each of the detectors 56 may be used to derive a representation of the lithology of the media surrounding the borehole. Such a technique is described in U.S. Pat. No. 3,864,569, issued to Tittman on Feb. 4, 1975 and assigned to the assignee of the present application. Briefly, the technique involves energy discrimination of the photons detected by each detector to permit normalization of the counts by taking a ratio of the count rate below a predetermined level ("soft" photon intensities) to the count rate above the predetermined energy level ("hard" photon intensities). In the event that lithology information is desired, it is necessary only to include a two-channel pulse-height analyzer for each detector to determine the soft and hard count rate, with a ratio of the count rate signals giving an indication of formation lithology.

When the burst of electrons incident on the target in the logging instrument is in the 20–25 MeV energy range, another logging technique, which makes use of the pair production interaction, is possible to determine a characteristic, such as density, from the media surrounding the borehole.

It is well known that the pair production process, which is represented schematically in FIG. 4, takes place when a high energy photon (for example,20 MeV) disappears in the field of a charged particle and an electron/positron pair appears. The probability that the process will occur varies as the square of the charge of the target particle, which may be an atomic nucleus or an electron, and increases with an increasing energy of the incident photon. It is also well known that at high energies the electron/positron pair produced by the photon would each tend to be traveling in a forward direction and, given an incident photon of 20 MeV, would each make an angle of approximately 1.5° with the original photon direction, so that the photon beam initially has only a very small component, due to pair production, added to its natural divergence. The electrons and positrons thus produced may radiate a photon (i.e. produce Bremsstrahlung) as they decelerate while passing through the earth formation. Thus, the process may begin all over again and be repeated until photon energy values drop below pair production threshold levels. Due to the regenerative nature of the process, much greater penetration of the earth formation results than might ordinarily be expected from photons in the 20 MeV range. The positron thus produced annihilates itself, usually upon coming to rest, by combining with an electron and produces two 511 keV photons that head off, back-to-back, in a direction which is random with respect to the incident beam direction.

Notwithstanding that the Compton scattering cross-section (the likelihood that a photon will Compton scatter) is approximately equal to or greater than the pair-production cross-section for photons in the 20–25 MeV range, the above described process is not seriously affected since for any energy above 2 to 3 MeV the Compton scattering angle tends to be very small, as discussed above, and the energy of the scattered photon and the spatial divergence of the photon beam is virtually unaltered. In other words, the result is a linear source of 511 key photons, the length of which depends on the end point energy of the electrons incident on the target in the logging instrument: the greater the electron energy, the longer the 511 keV source. Assuming an end-point energy for the electron burst of 20–25 MeV, the generation of annihilation 511 keV photons will occur all along the photon beam out to approximately 20–30 centimeters after the beam's emergence from the logging instrument.

Figure 5:
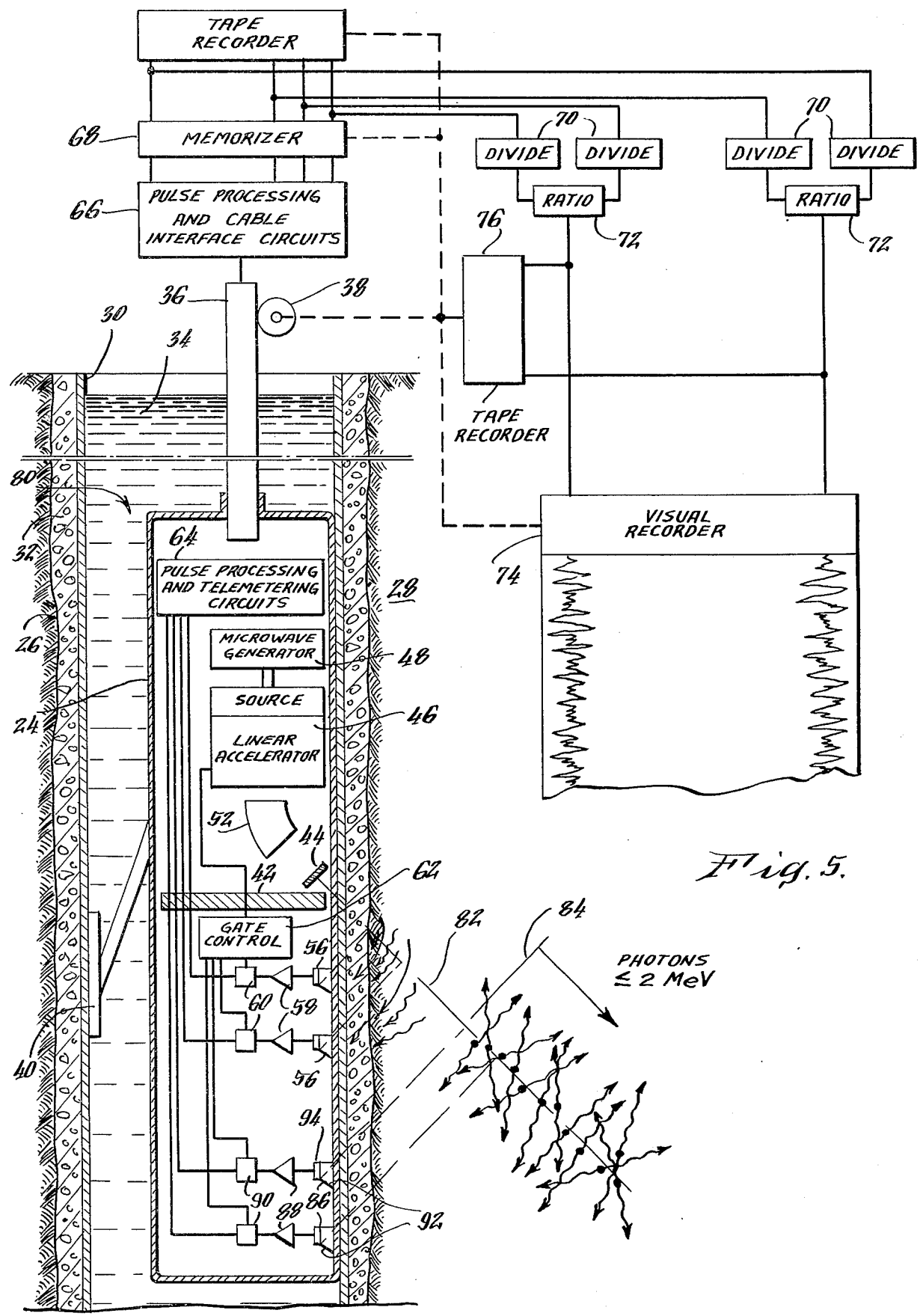
FIG. 5 is a representational view in longitudinal section showing another embodiment of a logging instrument in accordance with the present invention.

FIG. 5 shows a well logging instrument 80 that is configured to use the linear 511 KeV photon source to obtain density information concerning the earth formation and that is similar to the instrument 22 of FIG. 3, with the exception that the linear particle accelerator 46 emits, as described in the Turcott et al patent application identified above, a beam of high energy photons as shown in FIG. 1 herein that has an end-point energy of 20–25 MeV. Within instrument 80, components similar to those included in the embodiment of FIG. 3 have identical reference numerals and their descriptions and functions will not be restated except insofar as it is necessary to explain the operation of the embodiment of FIG. 5.

As described above, the photon beam 82 may be viewed as being made up of a number of components and, therefore, even though the end point energy of the beam 82 is approximately 25 MeV there are some photons emitted by the accelerator 46 that are less than 2 MeV. These photons are in an energy range in which Compton scatttering is the predominant reaction and they would, therefore, begin large angle Compton scattering shortly after emission from the instrument 80. Instrument 80 also includes one or more detectors 56 and their associated preamplifiers 58 and gates 60, all of which operate as described in connection with the instrument shown in FIG. 3.

Photons included within beam 82 that have energies exceeding 2–3 MeV, however, will penetrate more deeply into the media and earth formation surrounding the borehole producing pairs of annihilation 511 KeV photons all along its path (represented by the dotted line 82). Beyond some point, represented qualitatively at 84, the incident beam can be thought of as consisting of an isotropic source of 511 keV annihilation quanta linearly disposed along the beam direction up to 20–30 centimeters from its emergence from the instrument housing. Spaced from detectors 56 is at least one additional photon detector 86, which is positioned and adjusted in the instrument 80 to detect 511 keV photons that are emitted in the direction of the borehole. Detector 86 also has its associated preamplifier 88 and gate 90, which operate as described for previous embodiments.

The detected count rate, N, of detector 86 is proportional to the source intensity divided by the formation attenuation.

$$N = N_o e^{-\mu \rho x} \quad \quad 2.$$

where $N_o$ is the initial intensity of the linear source, $\mu$ is the mass absorption coefficient for 511 keV photons in the formation medium, $\rho$ is the density and $x$ is the average distance from the detector to the source in the formation (remembering that the 511 keV photons are produced by essentially a line source existing in the formation). Since $x$ and $\mu$ are known, and $N_o$ is proportional to the photon intensity, which can be determined, density $\rho$ can be determined.

Alternatively, when instrument 80 includes two detectors 86, a ratio of the detected count rates from the two detectors 86 (identified A and B) is given by:

$$\frac{N_A}{N_B} = e^{-\mu \rho (x_A - x_B)} \quad (3)$$

where $x_A$ and $x_B$ represent the average distances from the source to the respective detectors A and B. Thereby, the need to know the photon source intensity is eliminaed. If there is an intervening layer of mudcake, casing or cement, a ratio as described above in equation (3) also eliminates the effect of the intervening layers tranversed by the photons provided that the photons detected in both detectors traverse the same intervening layers. To further improve the depth of investigation sensitivity of the pair production-Compton scattering logging instrument shown in FIG. 5, the detectors may be collimated, generally as indicated at 92 and 94 to limit the directions from which incident photons can be detected.

As with the apparatus shown in FIG. 3, the apparatus disclosed in FIG. 5 is not limited to two Compton scattering detectors 56 and may be modified to include three or more annihilation detectors 86 to provide a profile of density versus distance from the borehole in the formation. Such a profile is especially of interest if the material adjacent to the logging instrument consists of several intervening layers such as casing, cement, residual mudcake, and an altered formation zone in front of the virgin formation. Furthermore, the apparatus of FIG. 5 may also be used to determine lithology information as discussed above in connection with the embodiment of FIG. 3 and as disclosed in the above-identified Tittman patent.

Signals from detectors 56 and 86, if passed by linear gates 60 and 90, are applied to a downhole pulse processing and telemetering circuit 64 that conditions and transmits the signals to the surface in a manner similar to that described in connection with FIG. 3. At the surface, the signals are received in a pulse processing and cable interface circuit 66 and are depth correlated in a memorizer 68 as described hereinbefore. The detected count rates for detectors 56 and 86 may then be combined in ratio circuits 72, after correction for the geometrically introduced distortion, to produce indications of density changes with depth in the borehole and at different distances from the borehole into the formation 28. As many divide circuits 70 and ratio circuits 72 may be provided as required, depending on the number of Compton scattering detector 56 and annihilation detectors 86.

In general, the Compton scattered count rate from detectors 56 will not be combinable with the count rates from detectors 86 unless detectors 56 have sufficiently good resolution, such as the resolution inherent from the lithium-drifted germanium or high purity germanium semiconductor detectors, to detect 511 annihilation photons and extract that count rate information from the Compton scattered count rate, which for purposes of combination with the count rate of detectors 86, would be treated as background. Once obtained, the outputs from ratio circuits 72 may be handled as described in connection with the embodiment of FIG. 3.

Although the invention has been described with reference to specific embodiments thereof, many other variations and modifications of the invention will be apparent to those skilled in the art without departing from the spirit and scope of the invention. For example, it is not intended to limit the present invention to the specific ratio technique for density indication determinations shown in FIGS. 3 and 5; any known method for taking a count accumulation representative of detected photons and producing a density representation would suffice. Furthermore, it is not necessary that the processing be done at the surface, since current developments in microprocessor technology permit such processing to be done downhole when desirable. The above described embodiments are, therefore, intended to be merely exemplary, and all such variations and modifications are intended to be included within the scope of the invention as defined in the appended claims.

I claim:

1. A method of detemining a characteristic of the media surrounding a borehole that traverses an earth formation and in which a high-intensity source has been pulsed to emit repetitive bursts of a continuous energy spectrum of photons that penetrate the media, comprising the steps of:

obtaining at least three indications of photons returning to a borehole as a result of the interaction of the emitted photons and the surrounding media, each indication being obtained at a different separation from the source along the axis of a borehole; and comparing the indications to determine at least two representations of a characteristic of the media surrounding a borehole.

2. A method according to claim 1 wherein time dependent indications of photons returning to a borehole are obtained.

3. A method according to claim 1 wherein the indications are compared to determine at least two representations of the density of the media surrounding a borehole.

4. A method of producing a representation of density profile of the media surrounding a borehole that traverses an earth formation and in which a high-intensity source has been pulsed to emit repetitive bursts of a continuous energy spectrum of photons that penetrate the media, comprising the step of:

obtaining at least three indications of photons returning to a borehole as a result of the interaction of the emitted photons and the surrounding media, each indication being obtained at a different separation from the source along the axis of a borehole;

comparing the indications to determine at least two representations of a characteristic of the media surrounding a borehole; and combining the at least two representations to produce a density profile of the media.

5. A method of logging the media surrounding a borehole that traverses an earth formation to determine a characteristic of the media comprising the steps of:

pulsing a high intensity source to emit repetitive bursts of a continuous energy spectrum of photons that penetrate the media surrounding a borehole;

obtaining at least three indications of photons returning to a borehole as a result of the interaction of the emitted photons and the surrounding media, each indication being obtained at a different separation from the source along the axis of a borehole; and comparing the indications to determine at least two representations of a characteristic of the media surrounding a borehole.

6. A method according to claim 5 wherein time dependent indications of photons returning to a borehole are obtained.

7. A method according to claim 5 wherein the indications are compared to determine at least two representations of the density of the media surrounding a borehole.

8. A method of logging the media surrounding a borehole that traverses an earth formation to produce a representation of a density profile of the media comprising the steps of:

pulsing a high intensity source to emit repetitive bursts of a continuous energy spectrum of photons that penetrate the media surrounding a borehole;

obtaining at least three indications of photons returning to a borehole as a result of the interaction of the emitted photons and the surrounding media, each indication being obtained at a different separation from the source along the axis of a borehole;

comparing the indications to determine at least two representations of the density of the media surrounding a borehole; and combining the at least two representations to produce density profile of the media.

9. A method of determining a characteristic of the media surrounding a borehole that traverses an earth formation and in which a high-intensity source has been pulsed to emit repetitive bursts of a continuous energy spectrum of photons that penetrate the media, comprising the steps of:

obtaining a plurality of indications of photons returning to a borehole as a result of the interaction of the emitted photons and the surrounding media, at least one indication being representative of annihilation photons returning to a borehole as a result of the interaction of the emitted photons and the surrounding media and each indication being obtained at a different separation from the source along the axis of a borehole; and comparing the indications to determine at least one representation of a characteristic of the media surrounding a borehole.

10. A method according to claim 9 wherein time dependent indications of photons returning to a borehole are obtained.

11. A method according to claim 9 wherein the indications are compared to determine at least one representation of the density of the media surrounding a borehole.

12. A method of determining a characteristic of the media surrounding a borehole that traverses an earth formation and in which a high-intensity source has been pulsed to emit repetitive bursts of a continuous energy spectrum of photons that penetrate the media, comprising the steps of:

obtaining a plurality of indications of annihilation photons returning to a borehole as a result of the interaction of the emitted photons and the surrounding media, each indication being obtained at a different separation from the source along the axis of a borehole; and comparing the indications to determine a representation of a characteristic of the media surrounding a borehole.

13. A method according to claim 12 wherein the indications are compared to determine a representation of the density of the media surrounding a borehole.

14. A method of logging the media surrounding a borehole that traverses an earth formation to determine a characteristic of the media comprising the steps of:

pulsing a high intensity source to emit repetitive bursts of a continuous energy spectrum of photons that penetrate the media surrounding a borehole;

obtaining a plurality of indications of photons returning to a borehole as a result of the interaction of the emitted photons and the surrounding media, at least one indication being representative of annihilation photons returning to a borehole as a result of the interaction of the emitted photons and the surrounding media and each indication being obtained at a different separation from the source along the axis of a borehole; and comparing the indications to determine at least one representation of a characteristic of the media surrounding a borehole.

15. A method according to claim 14 wherein time dependent indications of photons returning to a borehole are obtained.

16. A method according to claim 14 wherein the indications are compared to determine at least one representation of the density of the media surrounding a borehole.

17. A method of logging the media surrounding a borehole that traverses an earth formation to determine a characteristic of the media comprising the steps of:

pulsing a high intensity source to emit repetitive bursts of a continuous energy spectrum of photons that penetrate the media surrounding a borehole;

obtaining a plurality of indications of annihilation photons returning to a borehole as a result of the interaction of the emitted photons and the surrounding media, each indication being obtained at a different separation from the source along the axis of a borehole; and comparing the indications to determine a representation of a characteristic of the media surrounding a borehole.

18. A method according to claim 17 wherein the indications are compared to determine a representation of the density of the media surrounding a borehole.

19. Apparatus for logging the media surrounding a borehole that traverses an earth formation to determine a characteristic of the media comprising:

a high intensity source means emitting repetitive bursts of a continuous energy spectrum of photons that penetrate the media surrounding a borehole;

means for obtaining at least three indications of photons returning to a borehole as a result of the interaction of the emitted photons and the surrounding media, each indication obtaining means being positioned at a different separation from the source along the axis of a borehole; and means for comparing the indications to determine at least two representations of a characteristic of the media surrounding a borehole.

20. Apparatus according to claim 19 wherein the indication obtaining means obtains time dependent indications of photons returning to a borehole.

21. Apparatus according to claim 19 wherein the indication comparing means determines at least two representations of the density of the media surrounding a borehole.

22. Apparatus for logging the media surrounding a borehole that traverses an earth formation to determine a characteristic of the media comprising the steps of:

a high intensity source means emitting repetitive bursts of a continuous energy spectrum of photons that penetrate the media surrounding a borehole;

means for obtaining a plurality of indications of photons returning to a borehole as a result of the interaction of the emitted photons and the surrounding media, at least one indication being representative of annihilation photons returning to a borehole as a result of the interaction of the emitted photons and the surrounding media and each indication obtaining means being positioned at a different separation from the source along the axis of a borehole; and means for comparing the indications to determine at least one representation of a characteristic of the media surrounding a borehole.

23. Apparatus according to claim 22 wherein the indication obtaining means obtains time dependent indications of photons returning to a borehole.

24. Apparatus according to claim 22 wherein the indication comparing means determines at least one representation of the density of the media surrounding a borehole.

25. Apparatus for determining a characteristic of the media surrounding a borehole that traverses an earth formation and in which a high-intensity source has been pulsed to emit repetitive bursts of a continuous energy spectrum of photons that penetrate the media comprising:

means for obtaining a plurality of indications of annihilation photons returning to a borehole as a result of the interaction of the emitted photons and the surrounding media, each indication being obtained at a different separation from the source along the axis of a borehole; and means for comparing the indications to determine a representation of a characteristic of the media surrounding a borehole.

26. Apparatus according to claim 25 wherein the indication comparing means determines a representation of the density of the media surrounding a borehole.

* * * * *

UNITED STATES PATENT AND TRADEMARK OFFICE
CERTIFICATE OF CORRECTION

PATENT NO. : 3,976,879
DATED : August 24, 1976
INVENTOR(S) : Ronald E. Turcotte

It is certified that error appears in the above-identified patent and that said Letters Patent are hereby corrected as shown below:

Col. 5, line 23, "being" should read -- begin --;
Col. 5, line 35, "andd" should read -- and --;
Col. 5, line 48, "sectiion" should read -- section --;
Col. 6, line 46, after "of a" delete "information furthest";
Col. 7, line 39, "accelertor" should read -- accelerator --;
Col. 8, line 10, "emitter" should read -- emitted --;
Col. 10, line 1, "Turcott" should read -- Turcotte --;
Col. 10, line 16, "scatttering" should read -- scattering --'
Col. 10, line 66, "eliminaed" should read -- eliminated --;
Col. 12, line 5, "detemining" should read -- determining --;
Col. 12, line 33, "step" should read -- steps --.

Signed and Sealed this

First Day of February 1977

[SEAL]

Attest:

RUTH C. MASON
*Attesting Officer*

C. MARSHALL DANN
*Commissioner of Patents and Trademarks*